United States Patent Office.

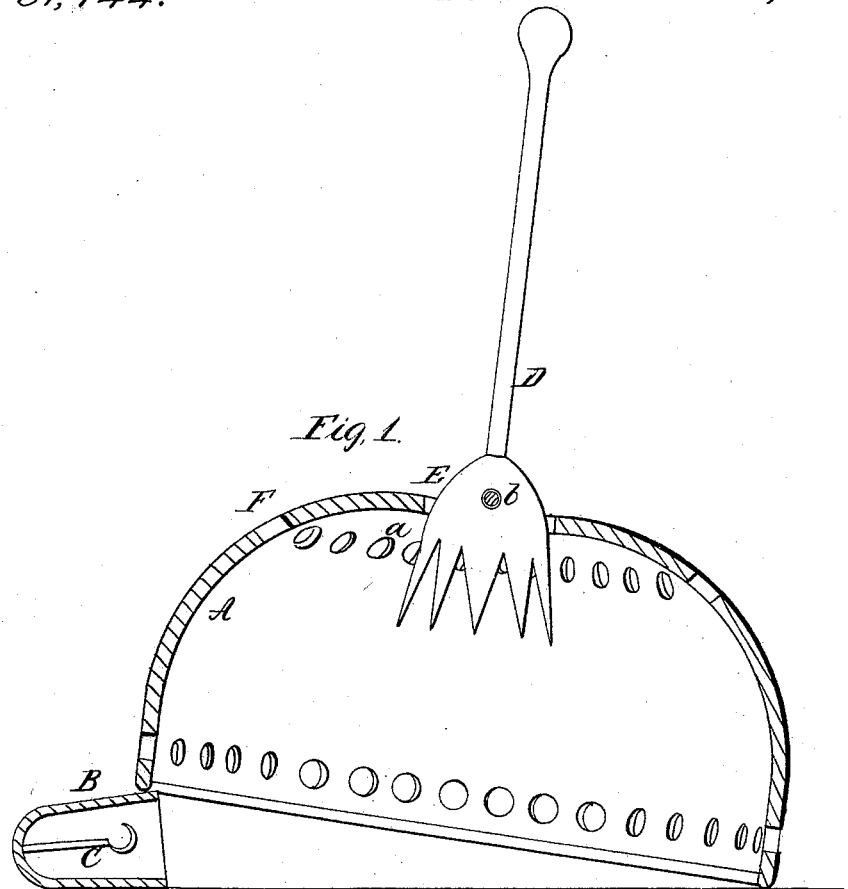
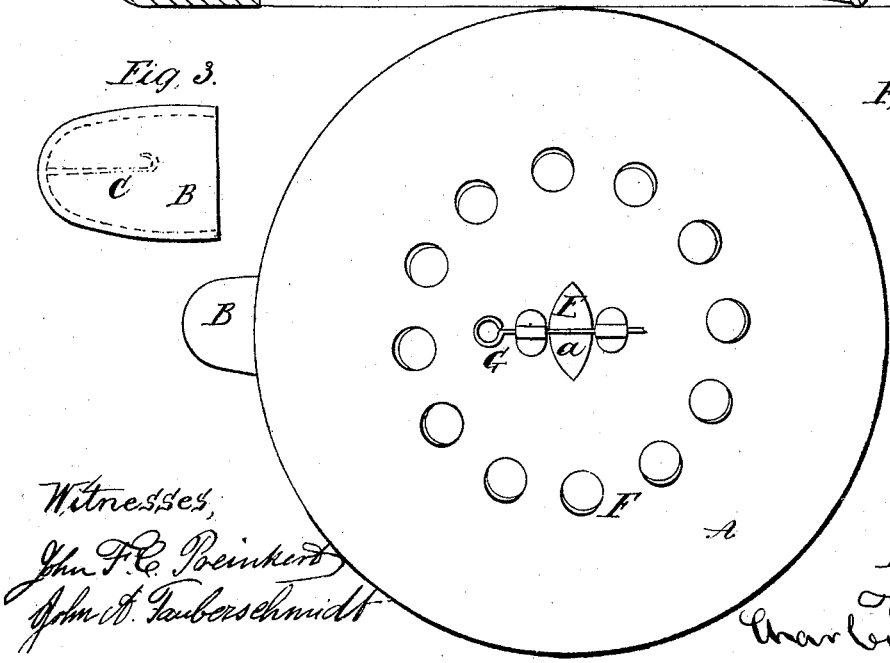

CHARLES HENERT, OF WASHINGTON, DISTRICT OF COLUMBIA.

Letters Patent No. 91,744, dated June 22, 1869.

IMPROVED ANIMAL-TRAP.

The Schedule referred to in these Letters Patent and making part of the same.

*To all whom it may concern:*

Be it known that I, CHARLES HENERT, of the city and county of Washington, in the District of Columbia, have invented a new and useful Improvement in Animal-Traps; and I do hereby declare that the following is a clear, full, and exact description thereof, sufficient to enable others skilled in the art to which my invention appertains, to fully understand and use the same, reference being had to the accompanying drawings, making part of this specification.

This invention has for its object to make an animal-trap, which is simple in construction, and effective, with surety in its results; and It consists in the peculiar arrangement of a cage, as commonly employed in that class of traps, with a bait-hook shell, by means of which the animal is safely entrapped; also providing the cage with a weapon, for destroying the life of the animal after being caught.

In the drawings—

Figure I represents a sectional view of my improved animal-trap;

Figure II, a top view of the same; and

Figure III represents a sectional view of the shell.

I shall now proceed to describe my invention, with reference to the drawing, like letters referring to like parts in the several figures.

A is the cage, of any convenient form, and any suitable material, having apertures F, to enable a person to look within the interior of the same.

B is a shell, of wood, metal, porcelain, or any other material, being of inclined shape, as plainly shown in Fig. I.

C is the bait-hook, rigidly, or otherwise, secured to the top of the shell B.

E is the weapon, connected with the rod D, or the former may be made in one piece with the rod. The function to be performed by the weapon E, is to stab, cut, or otherwise injure the animal in the cage, through which death is effected.

In the drawings, the weapon is shown as an enlarged end of the rod, formed in tines, and provided with cutting-edges. However, any convenient device effecting the same result may be used, if desired, as I do not wish to confine myself to the peculiar form shown.

G is a pin, holding up the weapon, as shown in Figs. I and II.

*a* is an opening, at or about the centre, in the top of the cage, of sufficient length to permit the rod D free play.

The operation is as follows:

The shell, with the bait-hook, is stationed at the desired place, the latter being provided with the usual contrivances to entice the animal.

The rod D is held up in the position shown in Fig. I, by the pin G.

The cage now is placed in a somewhat inclined position, by resting its lower circumference on the top edge of the shell B, all of which is plainly shown in Fig. I.

The trap is now ready for the animal, which will naturally travel under the cage, (the shell and cage being placed in such relation to each other, that access only can be had by going within or under the cage,) after the meat or bait with which the hook C is covered.

In this act of securing the bait, the shell B will slip inside of the cage, and the cage, being left without support, will descend; thus the animal is entrapped.

If it is desirable to kill the animal while in the prison, the pin G is removed, and, through the weapon E D, the animal may be stabbed, or otherwise injured, to secure death.

The main recommendation of my improved trap, is its simplicity in construction, and its general usefulness.

Having thus described my invention,

What I claim as new, and desire to secure by Letters Patent, is—

The perforated cage A, the shell B, and bait-hook C, in combination with the weapon D E, or its equivalent, substantially as described.

Witnesses:          CHARLES HENERT.
JOHN CHRISTMAN,
NIKOLAUS CHRISTMAN.